United States Patent Office 3,471,517
Patented Oct. 7, 1969

3,471,517
SPIROCYCLIC PEROXYGEN COMPOUNDS
Carol K. Ikeda, Wallingford, Pa., and Ben E. Sorenson, Wilmington, Del., assignors to E. I. du Pont de Nemours and Company, Wilmington, Del., a corporation of Delaware
No Drawing. Continuation of application Ser. No. 147,086, Oct. 23, 1961. This application Feb. 5, 1965, Ser. No. 430,740
Int. Cl. C07d 21/00; C08f 1/60
U.S. Cl. 260—340.7                12 Claims

ABSTRACT OF THE DISCLOSURE

Compounds of the general structure:

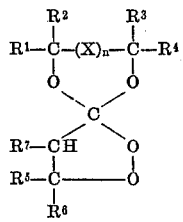

where:

$R^1$ is hydrogen or $C_1$ to $C_8$ alkyl terminated with —H, —OH, —COOH, $C_1$ to $C_4$ alkoxy or $C_1$ to $C_4$ carbalkoxy radicals;

$R^2$, $R^3$ and $R^5$ are hydrogen, $C_1$ to $C_8$ alkyl radicals, phenyl, diphenyl, halophenyl, tolyl, benzyl or β-phenylethyl;

$R^4$ is hydrogen, $C_1$ to $C_8$ alkyl radicals or benzyl;

$R^6$ and $R^7$ are hydrogen or $C_1$ to $C_3$ alkyl radicals;

X is methylene, ethylene or ethenylene or methylene substituted with (a) $C_1$ to $C_3$ alkyl, (b) $C_1$ to $C_3$ alkoxymethyl, (c) hydroxymethyl, (d) chlormethyl, (e) cyanomethyl or (f) benzoyl oxymethyl;

provided that at least three of $R^1$, $R^2$, $R^3$, $R^4$ and $R^5$ are hydrogen or said terminated $C_1$ to $C_8$ alkyl radicals; and n is 0 or 1, useful as vinyl polymerization initiators.

---

This application is a continuation of application Ser. No. 147,086, filed Oct. 23, 1961, now abandoned.

This invention relates to a new class of spiro-cyclic peroxygen compounds and to a process for making them. It is more particularly directed to compounds represented by the structure:

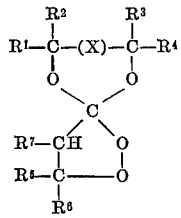

$R^1$ can be hydrogen or an alkyl radical terminated with a —H, —OH, or —COOH radical or an alkoxy or carbalkoxy radical of a lower alkyl alcohol;

$R^2$ and $R^3$ can be hydrogen, a $C_1$ to $C_8$ alkyl radical, phenyl, diphenyl, halophenyl, tolyl, benzyl or β-phenylethyl;

$R^4$ can be hydrogen, a $C_1$ to $C_8$ alkyl radical or benzyl;

$R^5$ can be hydrogen, a $C_1$ to $C_8$ alkyl radical, phenyl, diphenyl, halophenyl, tolyl, benzyl or β-phenylethyl;

$R^6$ and $R^7$ can be hydrogen or $C_1$ to $C_3$ alkyl radicals;

X can be methylene, ethylene, ethylene, or methylene substituted with such monovalent radicals as (a) $C_1$ to $C_3$ alkyl (b) $C_1$ to $C_3$ alkoxy methyl (c) hydroxymethyl, (d) chlormethyl, (e) benzoyloxymethyl or (f) cyanomethyl;

$n$ can be an integer having a value from 0 to 1; and $R^1$, $R^2$, $R^3$, $R^4$ and $R^5$ are selected such that at least three of these are hydrogen or $C_1$ to $C_8$ alkyl groups.

These compounds are generally liquids and are useful as initiators for the polymerization of vinyl compounds, e.g., styrene, and are particularly useful for higher temperature range polymerizations. These compounds, in addition, are the sources, via hydrolysis of the cyclic peroxide ring, of a unique class of hydroxyalkyl esters of hydroxyalkanoic acids, which, in turn are starting materials for polyester-type resins of well-known usefulness.

The compounds of this invention are preferably prepared by exposing a 2-(α-alkenyl) cyclic acetal to gaseous oxygen, at elevated temperatures, under substantially anhydrous conditions. This can be done by bubbling air or oxygen through the acetal in bulk form, i.e., molten or an inert solvent solution, or by treating a liquid acetal in droplet or falling film form. (Dioxane, toluene and trichloroethylene are examples of such inert solvents.)

A free radical source is desirable to initiate the reaction. This can be in the form of actinic light, a peroxidic compound or azo-bis-isobutyronitrile. Once initiated, the reaction is usually self-catalyzing.

The presence of an acidic compound to serve as a cyclization catalyst is also usually desirable to maximize formation of the spirocyclic peroxide. A large variety of materials can be used, with which the pH of the reaction can be dropped to between 1 and 6, and preferably to between 2 and 5. Frequently the oxidation reaction itself produces a sufficient drop in pH to maintain the cyclization reaction.

Such acidic materials as monochloracetic acid, trichloroacetic acid, trifluoracetic acid, phosphoric, sulfuric, p-toluene sulfonic acid and other aryl- and alkyl sulfonic acids are useful. The pH of such an organic reaction mixture is best determined on the water phase which is obtained by shaking and extracting the reaction mixture with an equal volume of water.

Temperatures in the range of 0–150° C. can be used for the reaction, though 60–100° C. is preferred. Generally, the greater the number of hydrogens on the carbon atoms of the cyclic acetal ring, the more essential the presence of an acid catalyst and the milder the conditions must be to preserve the formation of the cyclic peroxide. Conversely, as the substitution of groups other than hydrogen is increased on the ring, higher temperatures and lesser amounts of cyclization catalyst may be employed. Where an actinic light source is used as the initiator, lower temperatures are preferred.

A general method for preparing these compounds involves placing 0.44 gram mol of a purified 2-(α-alkenyl) cyclic acetal and about 0.1 gram of p-toluene sulfonic acid (to pH 2 by wet litmus) in a 500 ml. three-neck flask equipped with stirrer, thermometer, heater, reflux condenser, and metered oxygen inlet. The flask is then evacuated and flushed several times with oxygen and the temperature of the contents slowly raised so that an oxygen absorption rate of about 1 to 3 liters per hour is achieved. Temperatures in the range of 60–100° C. are usually sufficient, though about 95° C. is preferred. Anhydrous conditions are preferably maintained during the reaction.

After approximately 0.22 mol of oxygen has been absorbed over a period of 2 to 20 hours, the contents are cooled to room temperature and weighed to determine actual oxygen absorption. After weighing, the contents of the flask are fractionated at reduced pressure to remove unreacted acetal.

The residual material is then dissolved in about 2 volumes of benzene and stirred with 1 volume of 10% aqueous solution of caustic and cooled in an ice bath. After being stirred for about five minutes, the phases are separated and the organic portion is dried with anhydrous magnesium sulfate. The organic phase is then stripped of benzene and fractionated at reduced pressure to obtain the spirocyclic peroxide product.

The general reaction is illustrated by the following equation:

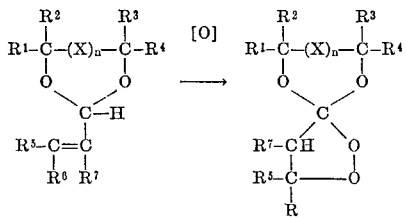

The invention is illustrated in more detail in the following examples:

The following examples illustrate different procedures which can be used to convert various 2-($\alpha$-alkenyl) cyclic acetals to their analogous spirocyclic peroxides:

| Vinyl Cyclic Acetal Starting Material | | | | | | | | Reaction Conditions | | | |
|---|---|---|---|---|---|---|---|---|---|---|---|
| $R^1$ | $R^2$ | $R^3$ | $R^4$ | $R^5$ | $R^6$ | $R^7$ | n | X | Catalyst | Hours | Temp., °C. |
| $CH_3$ | $CH_3$ | H | H | H | H | H | 0 | | 0.18% PTS[1] | 5 | 84–96 |
| $CH_3$ | H | H | H | H | H | H | 0 | | 0.35% PTS | 5.8 | 85.88 |
| $CH_3$ | $CH_3$ | $CH_3$ | H | H | H | H | 0 | | | 5.2 | 85–86 |
| $CH_3$ | $CH_3$ | $CH_3$ | $CH_3$ | H | H | H | 0 | | 0.05% Co[2] | 48 | 25 |
| $CH_3$ | $CH_3$ | $CH_3$ | $CH_3$ | H | H | H | 0 | | | 10 | 75–85 |
| $CH_3$ | H | H | H | $CH_3$ | H | H | 0 | | | 4 | 60–71 |
| $CH_3$ | $CH_3$ | $CH_3$ | $CH_3$ | $CH_3$ | H | H | 0 | | | 7 | 82–91 |
| $CH_3$ | $CH_3$ | $CH_3$ | $CH_3$ | H | H | $CH_3$ | 0 | | | 7 | 71–75 |
| $CH_3$ | H | $CH_3$ | H | $\phi$ | H | H | 0 | | | 2.7 | 60–63 |
| $CH_3$ | $CH_3$ | $CH_3$ | $CH_3$ | $\phi$ | H | H | 0 | | | 5.4 | 68–73 |
| $CH_3$ | $CH_3$ | $CH_2$ | H | H | H | H | 1 | —$CH_2$— | | 9.5 | 85–100 |
| $CH_3$ | $CH_3$ | $CH_3$ | $CH_3$ | H | H | H | 1 | —$CH_2$— | 0.05% Co[3] | 16 | 60–70 |

[1] p-Toluene sulfonic acid.
[2] As cobalt butyl phthalate solution in toluene 10 mg. Co/ml.
[3] Cobalt plus tertiary butyl hydroperoxide.

EXAMPLE 1

Fifty-six grams (0.44 mol) of 2-vinyl-4,4-dimethyl-1,3-dioxolane in a vessel are acidified by adding 0.1 gram of p-toluene sulfonic acid. The vessel is equipped with a stirrer, heater, thermometer, condenser and oxygen inlet. After sealing and evacuating to 10 mm. Hg pressure, oxygen is allowed to enter the vessel and the contents are heated to 95° C. and held there for about 5 hours until about 7 grams (0.22 mol) of oxygen are absorbed.

The contents are then cooled, dissolved in 70 ml. of benzene, washed once with 10% $Na_2O_3$ solution, dried with anhydrous $MgSO_4$ and transferred to a fractional distillation unit. The benzene is stripped off and the resulting spiro-cyclic peroxide 2,2-dimethyl-1,4,6,7 - tetraoxaspiro[4.4]nonane is distilled at 39° C. and 0.35 mm. Hg.

EXAMPLE 2

To a vessel equipped for stirring, heating, and refluxing are added 85 parts of 2-isopropenyl-4,4,5,5-tetramethyl-1,3-dioxolane. The vessel is sealed, evacuated to 10 mm. Hg pressure and filled with oxygen. The contents are then heated to 70° C. and maintained at about this temperature for about 7 hours, until 8.8 parts by weight of oxygen has been absorbed.

The contents are then cooled, transferred to a fractional distillation unit and distilled at about 66° C. and 0.3 mm. Hg pressure to recover the product, 2,2,3,3,9-pentamethyl-1,4,6,7-tetraoxaspiro[4.4]nonane. This material is useful as an initiator for vinyl polymerizations.

Acid hydrolysis of the product by refluxing in water with a trace of sulfuric acid for 3 hours produced 1,1,2,2-tetramethyl-2-hydroxyethyl ester of 3-hydroxyisobutyric acid.

EXAMPLE 3

In a vessel fitted with an oxygen inlet, a thermometer, and a heater are placed 56 parts of 2-vinyl-4,4,6,6-tetramethyl-1,3-dioxane, 0.028 part of cobalt metal as a cobalt butyl phthalate solution in toluene, and 0.11 part tertiary butyl hydroperoxide. The vessel is sealed, evacuated to 10 mm. Hg and filled with oxygen.

The contents are then heated to about 60° C. while being stirred vigorously, and oxygen absorption is begun. After 16 hours between 60° and 70° C., about 9 parts by weight of oxygen are absorbed. The product then is fractionated through a short Vigreaux column at 63° C. and 0.6 mm. Hg pressure. The product is 2,2,4,4-tetramethyl-1,5,7,8-tetraoxaspiro[5.4]decane. It is useful as a high temperature polymerization initiator for vinyl addition polymers.

In addition to those shown in the preceding examples, other compounds of the invention can be prepared from appropriate cyclic acetals under generally the same reaction conditions.

Within the limits of the generic structural formula in the first paragraph of this specification, compounds having $C_1$ to $C_8$ alkyl substituents include those whose R groups are methyl, ethyl, propyl, butyl, amyl, hexyl, heptyl and octyl. Alkoxy and carbalkoxy groups of lower alkanols that are terminal groups on said $C_1$ to $C_8$ alkyl radicals or are substituents on the divalent radical X include, for example, methoxy, ethoxy, propoxy, butoxy and carbomethoxy, carbethoxy, carbopropoxy and carbobutoxy.

R groups that are aryl or aralkyl radicals can be for example, phenyl, diphenyl, halophenyl, tolyl, xylyl, benzyl, $\beta$-phenyl ethyl and similar radical.

Thus, representative compounds of the invention with the above various R groups are illustrated by the following 1,4,6,7-tetraoxaspiro[4.4]nonanes:

2-vinyl-
2-propyl-
2-butyl-
2-benzyl-
2-hexyl-
2-hydroxymethyl-
2-(4-hydroxybutyl)-
2,3-diethyl-
2,3-divinyl-
2,3-diphenyl-
2,2,3,3-tetraethyl-
2,3,8-trimethyl-
2,3,8,9-tetramethyl-
2-propyl-8,9-dimethyl-
2-carbethoxyethyl-
2,3-dicarbethoxyethyl-
2-carbethoxyethyl-8-phenyl-
2-ethyl-3-(2-carbethoxyethyl)-

2-octa-3-(7-carboxyheptyl)-
2-benzoyloxymethyl-
2-(4-acetoxybutyl)-

Similar 1,5,7,8 - tetraoxaspiro[5.4]decanes can be prepared from the appropriate 2-vinyl-1,4-dioxanes under generally the same reaction conditions, and are exemplified below:

2-methyl-
2-propyl-
2-butyl-
3-hydroxy-
3-isopropyl-
2-hexyl-
9-methyl-
2-carbethoxyethyl
2,4-dicarbethoxyethyl
2,4-dimethyl-3-phenyl-
2,4-diethyl-
2,4-diphenyl-
3,3-dimethylol-
3,3-di(chloromethyl)-
3,3-dimethoxymethyl-
2,4-diethyl-9,10-dimethyl-
3,3-dimethyl-9-methyl-
2,3,4-trimethyl-
2,2,3,4,4-pentamethyl-
2,2,4,4-tetramethyl-9-ethyl-
3-methyl-3-cyanomethyl-
3-ethyl-3-benzoyloxymethyl- Further, such compounds as the 1,6,8,9-tetraoxaspiroundecanes and 1,6,8,9-tetraoxaspiro undec-3-enes can be prepared from the appropriate dioxepanes and dioxepenes such as for example:

10-methyl-1,6,8,9-tetraoxaspiro[6.4]undecane
2,2,5,5-tetramethyl-1,6,8,9-tetraoxaspiro [6.4] undecane
10-phenyl-1,6,8,9-tetraoxaspiro [6.4]undec-3-ene.

The above listed substituted nonanes, decanes, undecanes and undec-3-enes are not to be construed as the sole compounds of this invention, since compounds having different combinations of substituents are within the definition of the generic formula in the first paragraph.

Similarly, treatment with air or oxygen of compounds containing two or more α-alkenyl cyclic acetal groups under the conditions hereinbefore defined will lead to the corresponding spirocyclic peroxides. Thus, bis esters formed by esterifying hydroxy or carboxy substituted dioxolanes and dioxanes respectively with appropriate dicarboxylic acids or with aliphatic diols are sources of such peroxides upon subsequent treatment with oxygen. For example, the phthalate diester of 4-hydroxybutyl-2-vinyl-1,3-dioxolane can be so treated. Similarly, esters of fumaric, maleic, tricarballylic, butane-tetracarboxylic, pyromellitic, trimesic, adipic or sebacic acids can be used. The bis-2-vinyl cyclic acetal resulting from reaction of 1,2,5,6-hexanetetrol with acrolein is another compound that can be so treated.

The cyclic acetals used as starting materials to produce the compounds of this invention constitute a well-known class of compounds formed, for example, by the condensation of unsaturated aldehydes with appropriately substituted polyols under mild conditions. Representative aldehydes are acrolein, methacrolein, ethacrolein, crotonaldehyde, β-ethyl acrolein, β,β-dimethyl acrolein, 2-ethyl-2-hexenal, cinnamaldehyde, and tiglaldehyde. Ethylene glycol, glycerine, glycerin monomethyl ether, 2-methyl-2-ethylpropanediol - 1,3 - butanediol - 2,3, butanediol - 1,4, butenediol-1,4, 1,2-divinyl glycol, 4-methylpentanediol-2,4, 2,2,-dimethylbutanediol-1,3, 2,5-dimethylhexanediol-2,5, hexanetriol-1,2,6, hexanetetrol-1,2,5,6, pinacol, hydrobenzoin, sorbitol, 9,10-dihydroxy-stearic acid, pentaerythritol, pentaerythritol dimethyl ether, and 3-phenyl-pentanediol-2,4, trimethylol propane, trimethylol ethane, butanetetrol are examples of representative polyols.

Through a broad range of R group substituents can be used for the compounds of this invention as hereinbefore enumerated, certain categories of R groups are preferred. Thus, because of their lower boiling points, liquid nature and greater peroxidic activity at a given temperature, those compounds in which the $R^1$ group is hydrogen, methyl, ethyl, hydroxymethyl, hydroxyethyl, hydroxybutyl or 7-carboxyheptyl are preferred. $R^2$, $R^3$ and $R^4$ are preferably hydrogen, methyl ethyl, propyl or phenyl. $R^5$ is preferably hydrogen, methyl or phenyl. $R^6$ is preferably hydrogen and $R^7$ is preferably hydrogen or methyl. X is preferably methylene, dimethylolmethylene, ethylidene, isopropylidene, propylidene, hydroxyisopropylidene, but-2-ylidene or 1-hydroxy-but-2-ylidene. Further, at least four of the groups $R^1$ through $R^7$ should be hydrogen or methyl.

By the phrase "alkenyl" in the name α-alkenyl cyclic acetals is meant both normal monovalent alkenyl as well as substituted alkenyl radicals as designated by $R^5$, $R^6$ and $R^7$ substituents.

The claims are:
1. A spirocyclic peroxide compound having the structural formula:

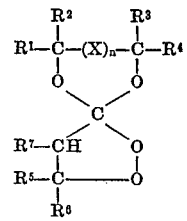

in which:

$R^1$ is selected from the class consisting of hydrogen, and $C_1$ to $C_8$ alkyl terminated with —H, —OH, —COOH, $C_1$ to $C_4$ alkoxy and $C_1$ to $C_4$ carbalkoxy radicals;

$R^2$ and $R^3$ are selected from the class consisting of hydrogen, $C_1$ to $C_8$ alkyl radicals, phenyl, diphenyl, halophenyl, tolyl, benzyl and β-phenylethyl;

$R^4$ is selected from the class consisting of hydrogen, $C_1$ to $C_8$ alkyl radicals and benzyl;

$R^5$ is selected from the class consisting of hydrogen, $C_1$ to $C_8$ alkyl radicals, phenyl, diphenyl, halophenyl, tolyl, benzyl or β-phenylethyl;

$R^6$ and $R^7$ are selected from the class consisting of hydrogen and $C_1$ to $C_3$ alkyl radicals;

X is a divalent radical selected from the class consisting of methylene, ethylene and ethenylene radicals and methylene radicals substituted with monovalent radicals from the class consisting of (a) $C_1$ to $C_3$ alkyl, (b) $C_1$ to $C_3$ alkoxymethyl, (c) hydroxymethyl, (d) chloromethyl, (e) cyanomethyl, and (f) benzoyl oxymethyl;

provided $R^1$, $R^2$, $R^3$, $R^4$ and $R^5$ are such that at least three of these are selected from the class consisting of hydrogen and said terminated $C_1$ to $C_8$ alkyl radicals;

n is an integer having a value from 0 to 1.

2. 2-methyl-1,4,6,7-tetraoxaspiro [4.4]nonane.
3. 2,2-dimethyl-1,4,6,7-tetraoxaspiro[4.4]nonane
4. 2,2,3-trimethyl-1,4,6,7-tetraoxaspiro [4.4]nonane
5. 2,2,3,3-tetramethyl - 1,4,6,7 - tetraoxaspiro [4.4] nonane.
6. 2,8-dimethyl-1,4,6,7-tetraoxaspiro [4.4]nonane.
7. 2,2,3,3,8 - pentamethyl - 1,4,6,7 - tetraoxaspiro [4.4] nonane.
8. 2,2,3,3,9 - pentamethyl - 1,4,6,7 - tetraoxaspiro [4.4] nonane.

9. 2,3 - dimethyl - 8 - phenyl - 1,4,6,7 - tetraoxaspiro [4.4]nonane.

10. 2,2,3,3 - tetramethyl - 8 - phenyl - 1,4,6,7 - tetraoxaspiro [4.4]nonane.

11. 2,2,4 - trimethyl - 1,5,7,8 - tetraoxaspiro [5.4] decane.

12. 2,2,4,4 - tetramethyl - 1,5,7,8 - tetraoxaspiro [5.4] decane.

No references cited.

ALEX MAZEL, Primary Examiner

J. H. TURNIPSEED, Assistant Examiner

U.S. Cl. X.R.

204—158; 260—75, 93.5, 338, 340.9, 484